United States Patent [19]

Meshkat

[11] Patent Number: 5,248,922
[45] Date of Patent: Sep. 28, 1993

[54] MULTI-DSP, MULTI-FUNCTIONAL MOTION CONTROLLER

[75] Inventor: Saeid Meshkat, Minneapolis, Minn.

[73] Assignee: Motion Control Technologies, Inc., Edina, Minn.

[21] Appl. No.: 874,799

[22] Filed: Apr. 27, 1992

[51] Int. Cl.⁵ .............................................. G05B 11/01
[52] U.S. Cl. ..................................... 318/560; 318/35; 318/51; 318/53; 318/59; 318/61; 318/62; 318/63; 318/67
[58] Field of Search ............... 318/34, 51, 53, 59, 318/61, 62, 63, 67

[56] References Cited

U.S. PATENT DOCUMENTS

| | | | |
|---|---|---|---|
| 3,832,616 | 8/1974 | Vinner | 318/576 |
| 4,392,096 | 7/1983 | Grajewski et al. | 318/51 X |
| 4,878,002 | 10/1989 | Heatzig et al. | 318/568.2 |
| 5,013,981 | 5/1991 | Rodi | 318/67 |
| 5,087,864 | 2/1992 | Abel | 318/34 |
| 5,126,640 | 6/1992 | Leroy | 318/34 |

Primary Examiner—William M. Shoop, Jr.
Assistant Examiner—Karen Masih
Attorney, Agent, or Firm—Kinney & Lange

[57] ABSTRACT

A motion controller, which is adaptable to a variety of different motors, provides motor control signals to the motors of a multi-axis coordinated system as a function of position and velocity commands from a host computer. The motion controller configures the motor control signals to be compatible to the particular motors being driven based upon motor identification instructions from the host computer.

11 Claims, 6 Drawing Sheets

MULTI-DSP, MULTI-FUNCTIONAL MOTION CONTROLLER

BACKGROUND OF THE INVENTION

This invention relates to a motion controller for automated machinery. More specifically, the invention relates to a controller for providing control of four axes of motion, the system being programmable to accommodate a variety of motors and provide appropriate power control signals no matter what motor is used.

Multi-axis motion controllers are known in the prior art. See, for example, U.S. Pat. No. 4,878,002 by Heatzig et al. However, such controllers do not easily adapt to various motors. Multi-axis motion controllers of the prior art are designed to operate with a single type of motor. Motor control is typically provided through hard-wired circuitry. Motion controllers of the prior art cannot be made to operate with various motors except through hardware redesign and modification. This increases the expense and reduces the flexibility of prior-art motion controllers.

Accordingly, there exists a need in the art for a fully digital multi-axis motion controller which can be easily adapted to operate with any of a number of different motor types or power stage types.

SUMMARY OF THE INVENTION

The present invention receives a control request and a motor identification command representative of the type of motor to be controlled, and provides a power control signal based on the type of motor to be controlled, the control request and a control function implemented in the present invention.

The present invention receives positioning and velocity commands from a host computer attached to a conventional bus, such as an ISA bus, a Multibus or a VME bus. These positioning commands are stored in dual port RAM. The commands are transmitted to a first digital signal processor (DSP) which interprets the commands and converts each command received from the host computer into a large number of smaller slices. This technique provides for smoothness of motion. The interpreted motion commands are then provided to a second digital signal processor. This digital signal processor produces position and velocity commands for each of four axes of motion. The position and velocity commands are then supplied to digital-to-analog converters and also placed on a DSP bus. The motion control signals placed on the DSP bus are placed into two dual port RAMS. The data from each dual port RAM is read by a digital signal processor. Each digital signal processor is configured to provide power signals for each of two axes of motion. In response to information given by the operator, the host computer provides instructions to the digital signal processors. The digital signal processors use the instructions provided by the host computer to configure their operation to the requirements of the types of motors being used.

DETAILED DESCRIPTION OF THE PREFERRED EMBODIMENTS

Figure 1:
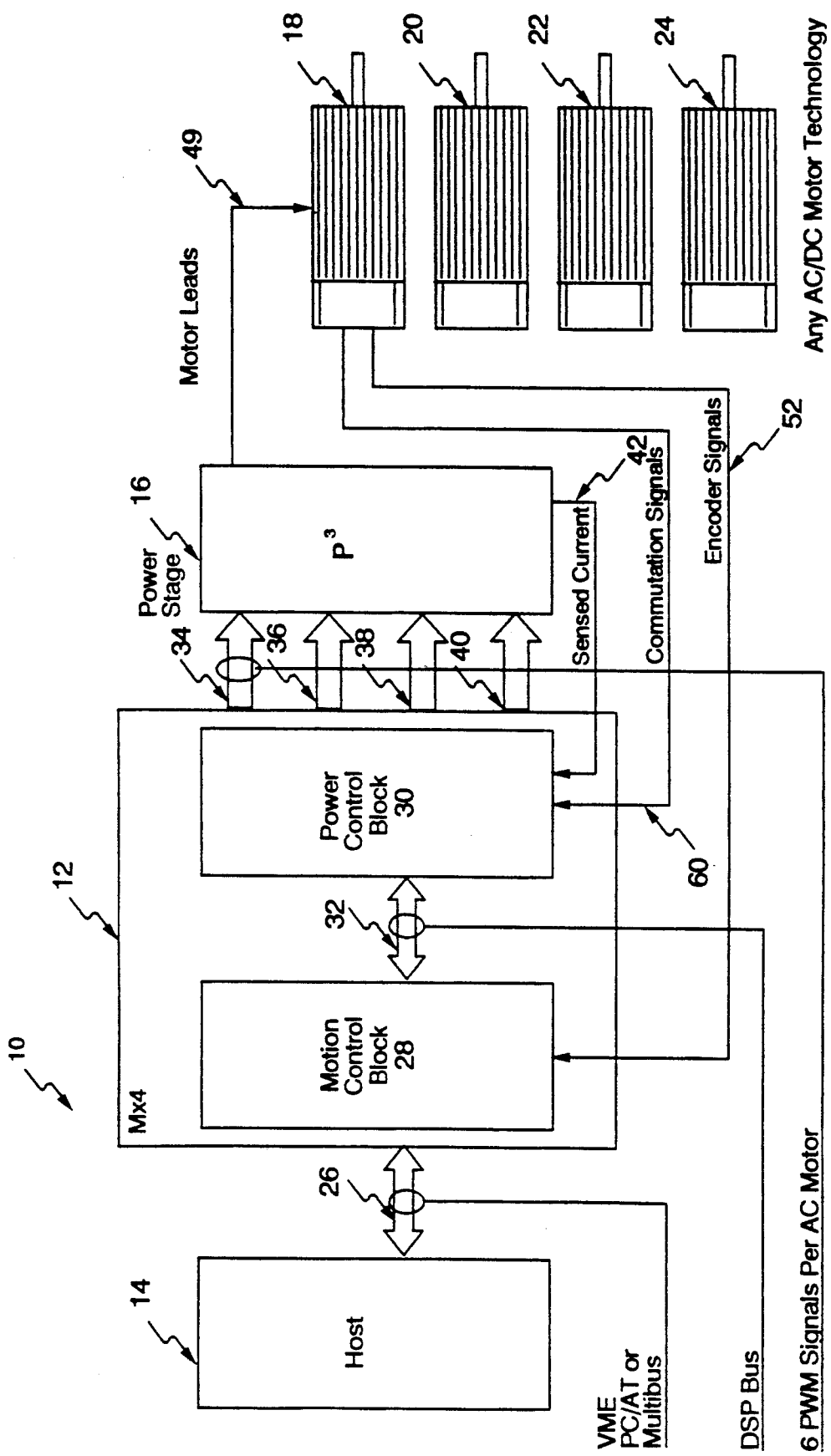
FIG. 1 is a block diagram of a control system employing a motion controller according to the present invention.

FIG. 1 shows four-axis motion control system 10 using motion controller 12 according to the present invention. Motion control system 10 includes motion controller 12, host computer 14, power stage 16, and four motors 18, 20, 22 and 24. Host computer 14 communicates with motion controller 12 via standard industrial bus 26. Standard bus 26 can be any of a number of types of bus, such as a VME bus, an ISA bus, or a multibus. Motion controller 12 includes two blocks, motion control block 28 and power control block 30. Motion control block 28 and power control block 30 communicate with one another via digital signal processor bus 32.

Motion controller 12 transmits to power stage 16, four sets of pulse-width-modulated (PWM) signals over buses 34, 36, 38 and 40. Power stage 16 transmits sensed current I to motion controller 12 over line 42. Power stage 16 communicates with motors 18, 20, 22 and 24 via motor leads. Four motor lead sets connect motors 18, 20, 22 and 24 to power stage 16, one set of three leads for each motor. However, for clarity, only the motor lead set 49 connecting motor 18 to power stage 16 is shown. Motors 18, 20, 22 and 24 transmit to motion controller 12 encoder signals (representing the relative position of the motor shaft) and commutation signals (representing the absolute position of the motor shaft). Encoder signals are transmitted to the motion control block 28 of motion controller 12 over separate signal paths, one for each motor. For the sake of clarity, only path 52, from motor 18, is shown. The encoder signals are also supplied to power control block 30 via digital signal processor bus 32. Commutation signals are transmitted directly to power control block 30. For the sake of clarity, only lines 60 from motor 18 are shown.

Host computer 1 initializes motion controller 12 by transmitting via standard bus 26 commands to set up parameters appropriate for the motors 18, 20, 22 and 24 being used. These commands are transmitted to power control block 30 via digital signal processor bus 32.

Host computer 14 transmits position and velocity commands for each of four axes to motion controller 12 at 5-millisecond intervals. Each position command transmitted by host computer 14 is transmitted to motion control block 28 of motion controller 12 via standard bus 26. Motion control block 28 performs high-order interpolation on each 5-millisecond position and velocity command and divides the command into fifty 200-microsecond commands. Motion control block 28 also performs a state feedback control function for the position and velocity command for each axis of motion. The interpolated position and velocity commands are used as inputs to position and velocity feedback loops.

The encoder signals from motors 18, 20, 22 and 24 are used as feedback in the control function. The output of the control function is a velocity output. The velocity output can be supplied as an analog output, or placed on digital signal processor bus 32 and furnished to power control block 30.

Power control block 30 receives the velocity output from digital signal processor bus 32. Power control block 30 also receives sensed currents from power stage 16, commutation signals from motors 18, 20, 22 and 24 and encoder signals from motors 18, 20, 22 and 24. The encoder signals are routed through motion control block 28 and placed on digital signal processor bus 32. Power control block 30 further receives motor selection commands supplied by host computer 14. The motor selection commands are also routed through motion control block 28 to power control block 30 via the digital signal processor bus 32.

Power control block 30 uses encoder signals and sensed currents as feedback elements in a feedback loop. Depending on commands received from host computer, power control block 30 selects encoder signals or commutation signals for use in the feedback loop. Power control block 30 employs the feedback loop to produce a motor control output which is linearly responsive to the velocity output received from motion control block 28 via digital signal processor bus 32. The motor control output is produced as a set of six pulse-width-modulated (PWM) signals for each motor. The sets of PWM signals are delivered to power stage 16 over buses 34, 36, 38 and 40. The power control block 30 employs the motor selection signals supplied by host computer 14 to configure the motor control output to control the particular types of motors 18, 20, 22 and 24 used in motion control system 10.

Control system 10 of the present invention provides a smooth motion that is linearly responsive to the commands of host computer 14. Moreover, by using motion controller 12 of the present invention, the operator is able to configure motion control system 10 to operate with any of a number of different motor types. This can be accomplished easily by entering the appropriate command in the host computer 14.

Figure 2:
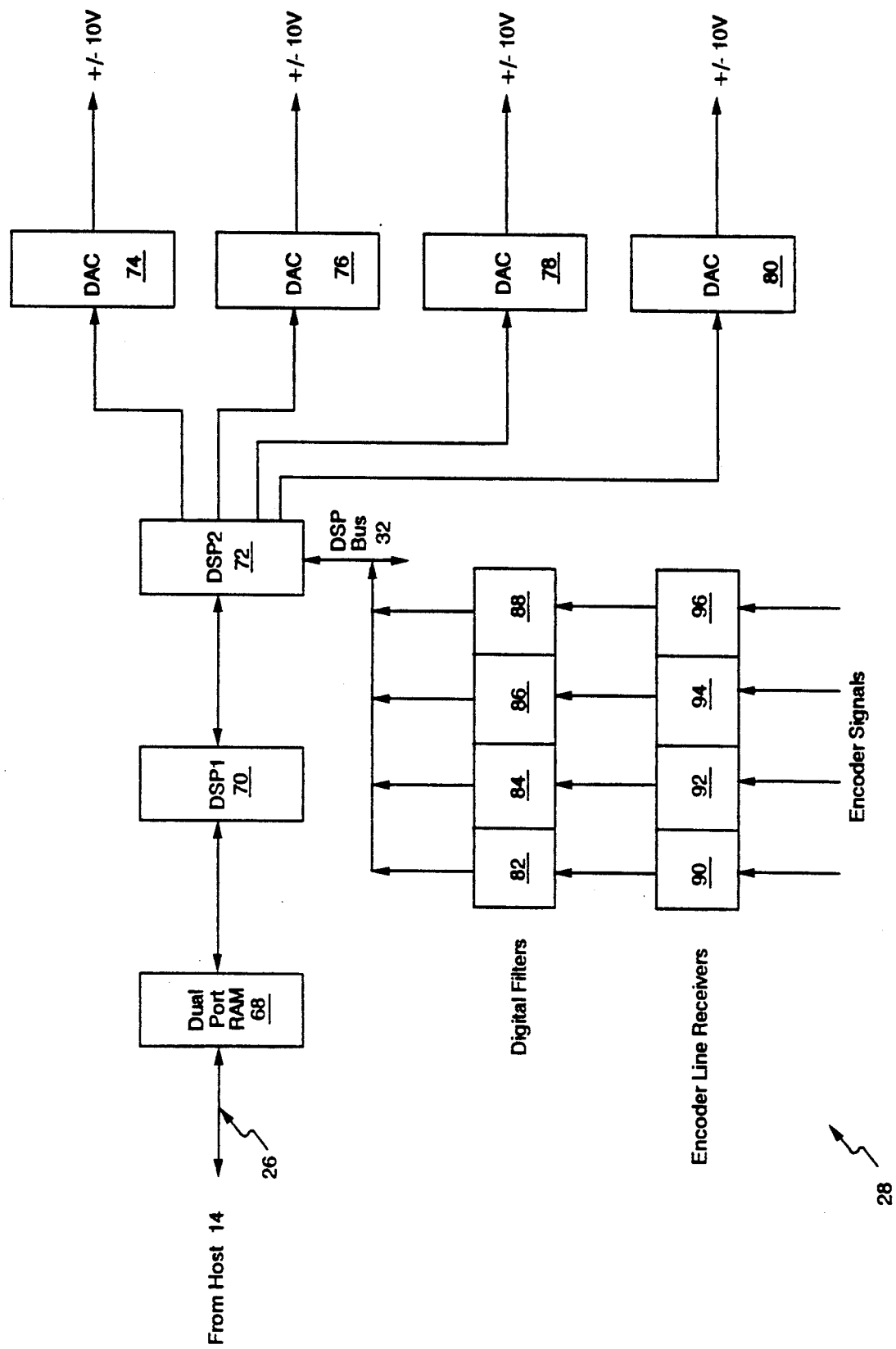
FIG. 2 is a functional block diagram of a motion controller according to the present invention.

FIG. 2 is a more detailed block diagram of motion control block 28 of the present invention. Motion control block 28 communicates with host computer 14 over standard industrial bus 26. Industrial bus 26 is connected to first dual port RAM 68. First dual port RAM 68 is connected to first digital signal processor (DSP) 70, which is in turn connected to second digital signal processor (DSP) 72. Second digital signal processor 72 is connected to digital signal processor bus 32 and to digital-to-analog converters 74, 76, 78 and 80. Digital signal processor bus 32 is connected to digital filters 82, 84, 86 and 88 which are in turn connected to line receivers 90, 92, 94, and 96.

Every 5 milliseconds, host computer 14 passes along standard bus 26 to first dual port RAM 68 position and velocity commands for each axis of motion. The position and velocity commands represent the desired position at the end of 5 milliseconds. First digital signal processor 70 reads each position command from first dual port RAM 68 and breaks it into 200-microsecond intervals. For each 200-microsecond interval, first digital signal processor 70 then produces a position and a velocity command for each axis of motion. First digital signal processor 70 then passes to second digital signal processor 72 the position and velocity commands for each axis of motion.

Second digital signal processor 72 processes the position and velocity commands received from first digital signal processor 70 by performing a state feedback control function, which will be explained later with reference to FIG. 3. Second digital signal processor 72 produces for each axis of motion a velocity output. The velocity outputs are provided to digital-to-analog converters 74, 76, 78 and 80 and are also placed on digital signal processor bus 32. Digital-to-analog converters 74, 76, 78 and 80 furnish analog outputs of $+/-10$ V. These outputs can be provided directly to conventional servo amplifiers, so that the servo amplifiers can be driven directly off of motion control block 28 if desired.

Motion control block 28 receives the position encoder signals from motors 18, 20, 22 and 24. These encoder signals are placed on digital signal processor bus 32 and provided to second digital signal processor 72 to provide for each axis of motion the position feedback component of the state feedback loop. The encoder signals are also passed to first digital signal processor 70 where they are processed and furnished to host computer 14 to update the position information of host computer 14.

Figure 3:
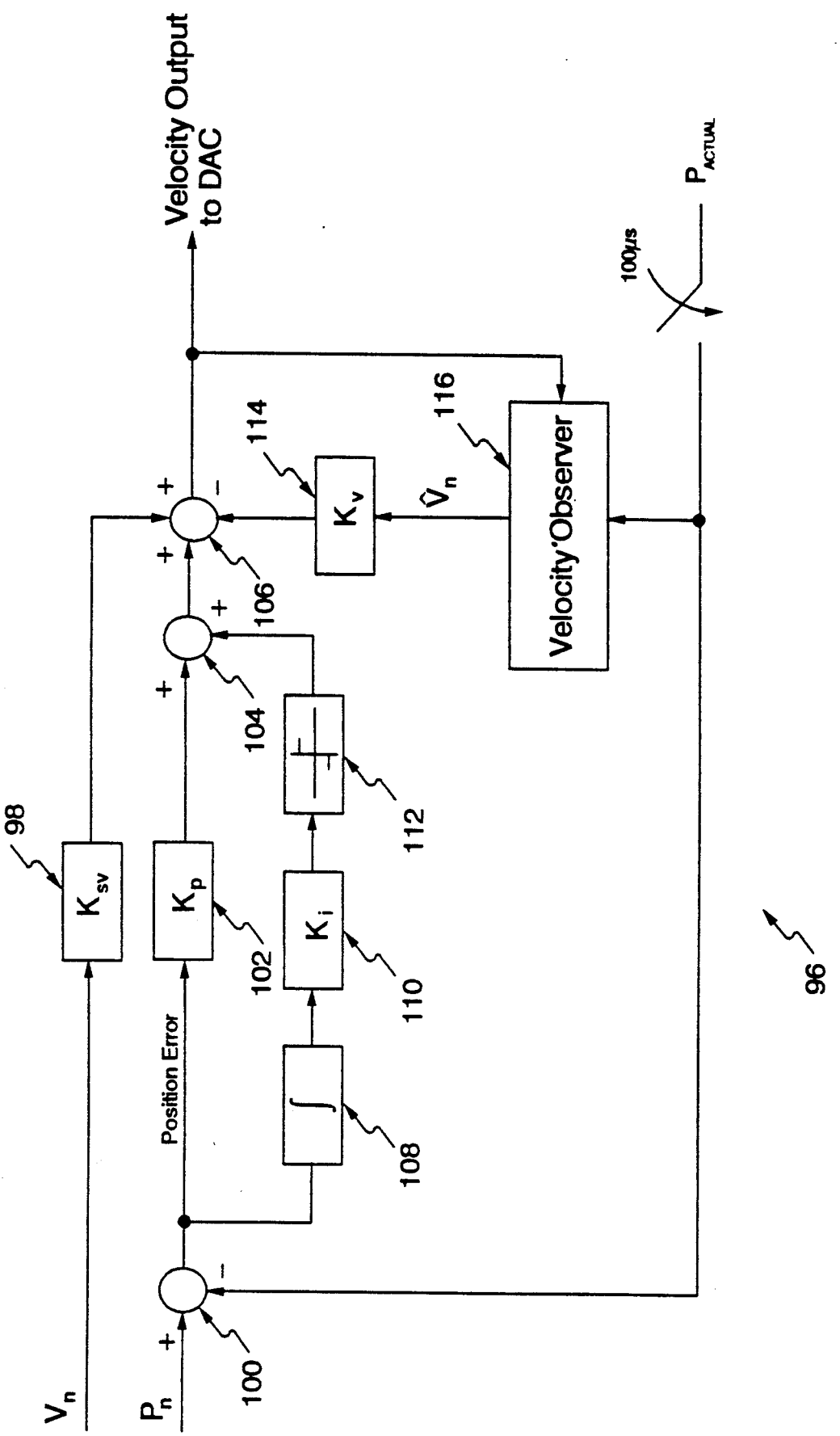
FIG. 3 is a transfer function representation of an algorithm used to calculate position and velocity vectors.

FIG. 3 is a representation of state feedback control function 96 implemented by second digital signal processor 72. Control function 96 is implemented for each of four axes of motion. Control function 96 has as inputs the velocity and position commands $V_n$, $P_n$ received from first digital signal processor 70. Control function 96 also receives as an input the position information $P_{ACTUAL}$ received from the encoder signal for its corresponding axis of motion. The position information is passed to first summing node 100. An actual position signal representing the actual position of the corresponding motor is switched through switch 101 at 100-microsecond intervals and passed from the corresponding motor to first summing node 100. The position information is combined with the actual position signal to produce a position error signal. The position error signal is passed to integrator function 108, then to integral gain function 110, which provides an integral action, then to limit function 112 to produce a limited integral action. The adjusted integral action is passed to summing node 104.

The position error signal is also passed to position gain function 102 to produce a proportional position error. The adjusted position error is passed to summing node 104 and combined with the adjusted current signal to produce a corrected position signal.

The position information is furnished to velocity observer 116 to produce a velocity input. The velocity input is passed to velocity gain function 114 to produce an adjusted velocity input. The adjusted velocity input is passed to summing node 106. The velocity command from digital signal processor 70 is provided to gain block 98 and then to summing node 106. The adjusted velocity input is combined with the controlled position error and the signal from gain block 106 to produce a velocity output signal. Control function 96 is performed for each axis, with velocity output signals for the four axes being provided to digital-to-analog converters 74, 76, 78 and 80, and also being placed on digital signal processor bus 32.

Figure 4:
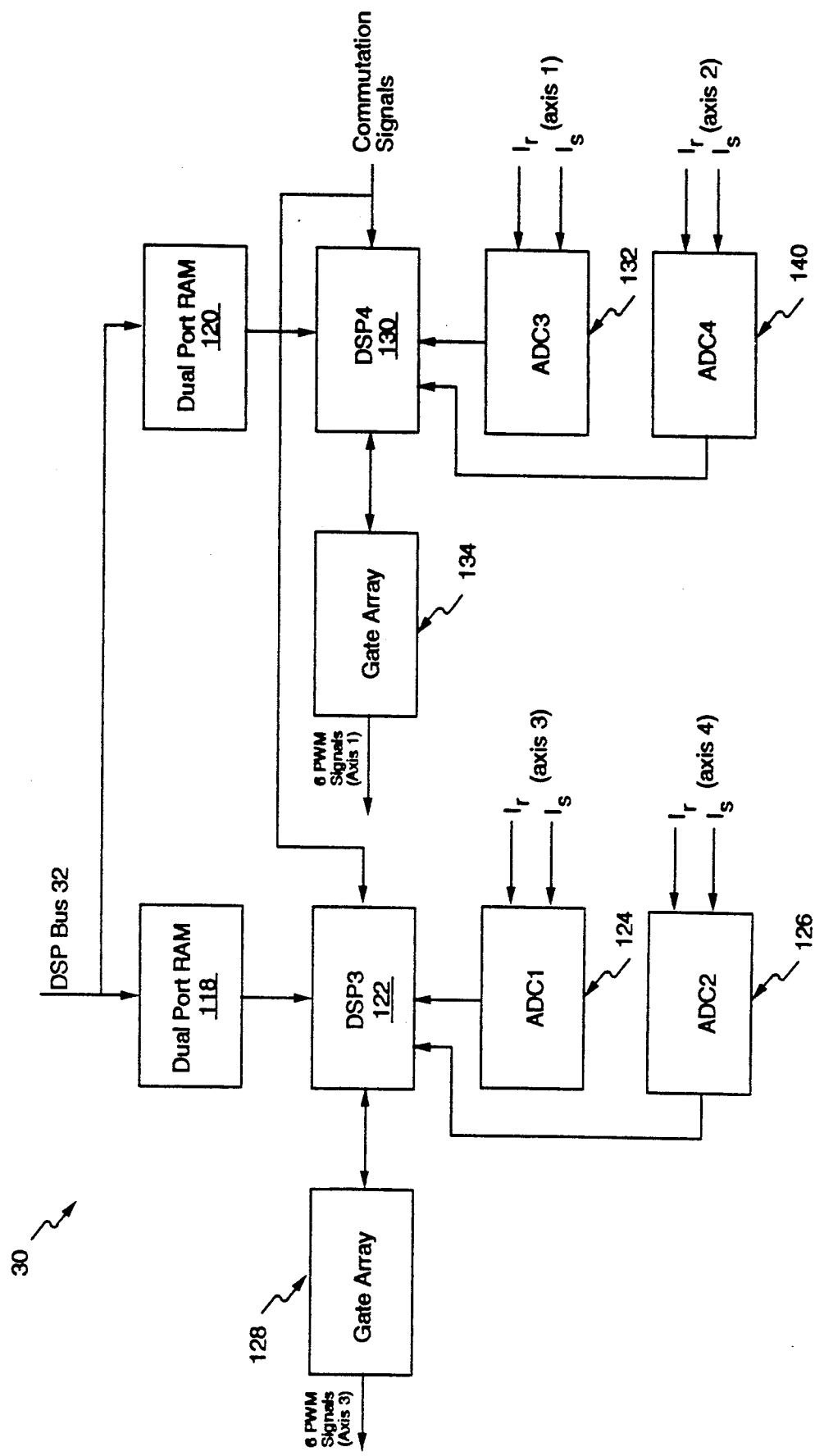
FIG. 4 is a functional block diagram of a power control portion of a motion controller according to the present invention.

FIG. 4 is a more detailed block diagram of power control block 30 of the present invention. Power control block 30 includes second dual port RAM 118 and third dual port RAM 120, both of which are connected to digital signal processor bus 32. Second dual port RAM 118 is connected to third digital signal processor 122. Third digital signal processor 122 is connected to first analog-to-digital converter 124 and second analog-to-digital converter 126 and to gate array 128. Third dual port RAM 120 is connected to fourth digital signal processor 130. Fourth digital signal processor 130 is connected to third analog-to-digital converter 132 and fourth analog-to-digital converter 140 and to gate array 134.

Power control block 30 receives each of four velocity output signals which are transferred from motion control block 28 over digital signal processor bus 32. Velocity output signals for two axes of motion are loaded into first dual port RAM 118 and velocity output signals for the other two axes of motion are loaded into second dual port RAM 120. Power control block 30 also receives commutation signals which are fed into third digital signal processor 122 and fourth digital signal processor 130. Power control block 30 further receives encoder signals which are passed over digital signal processor bus 32 from motion control block 28. Power control block 30 also receives instructions which are passed from host computer 14 through motion control block 28 and over digital signal processor bus 32 to power control block 30. These instructions are used by power control block 30 to configure its operation to the type of motor being used.

In order to provide power control for the first axis of motion, the corresponding velocity output signal and encoder signal are read into fourth digital signal processor 130 from third dual port RAM 120. In response to information provided by the operator, host computer 14 passes instructions to fourth digital signal processor 130 by passing the instructions along digital signal processor bus 32 and loading them into third dual port RAM 120. The instructions supplied by host computer 14 are used by fourth digital signal processor 130 to select the correct algorithms to be used in processing the information transferred to fourth digital signal processor 130, and otherwise to adapt its processing to the requirements of the type of motor being used. Third analog-to-digital converter 132 receives sensed phase currents $I_r$ and $I_s$ from power stage 16 and supplies digital representations of the currents to fourth digital signal processor 130. Commutation signals for the first axis of motion are supplied to second gate array 134 which, in turn, furnishes them to fourth digital signal processor 130.

Fourth digital signal processor 130 receives as an input the velocity output signal produced by motion control block 28 and employs a control function to achieve, for each phase of a three-phase motor, a power control signal linearly responsive to the velocity output signal. Fourth digital signal processor 130 uses phase currents $I_r$ and $I_s$, the commutation signals and the encoder signals as feedback elements. Fourth digital signal processor 130 uses motor selection commands from host computer 14 to adapt the processing performed in fourth digital signal processor 130 to the specific motor type being used. Fourth digital signal processor 130 passes power control signals to second gate array 134. Second gate array 134 performs dead band generation to produce six PWM signals linearly responsive to the velocity output signal.

Similar processing is performed by fourth digital signal processor 130 to produce power control signals for the second axis of motion. Third digital signal processor 122 operates similarly to produce power control signals for the third and fourth axes of motion.

Figure 5:
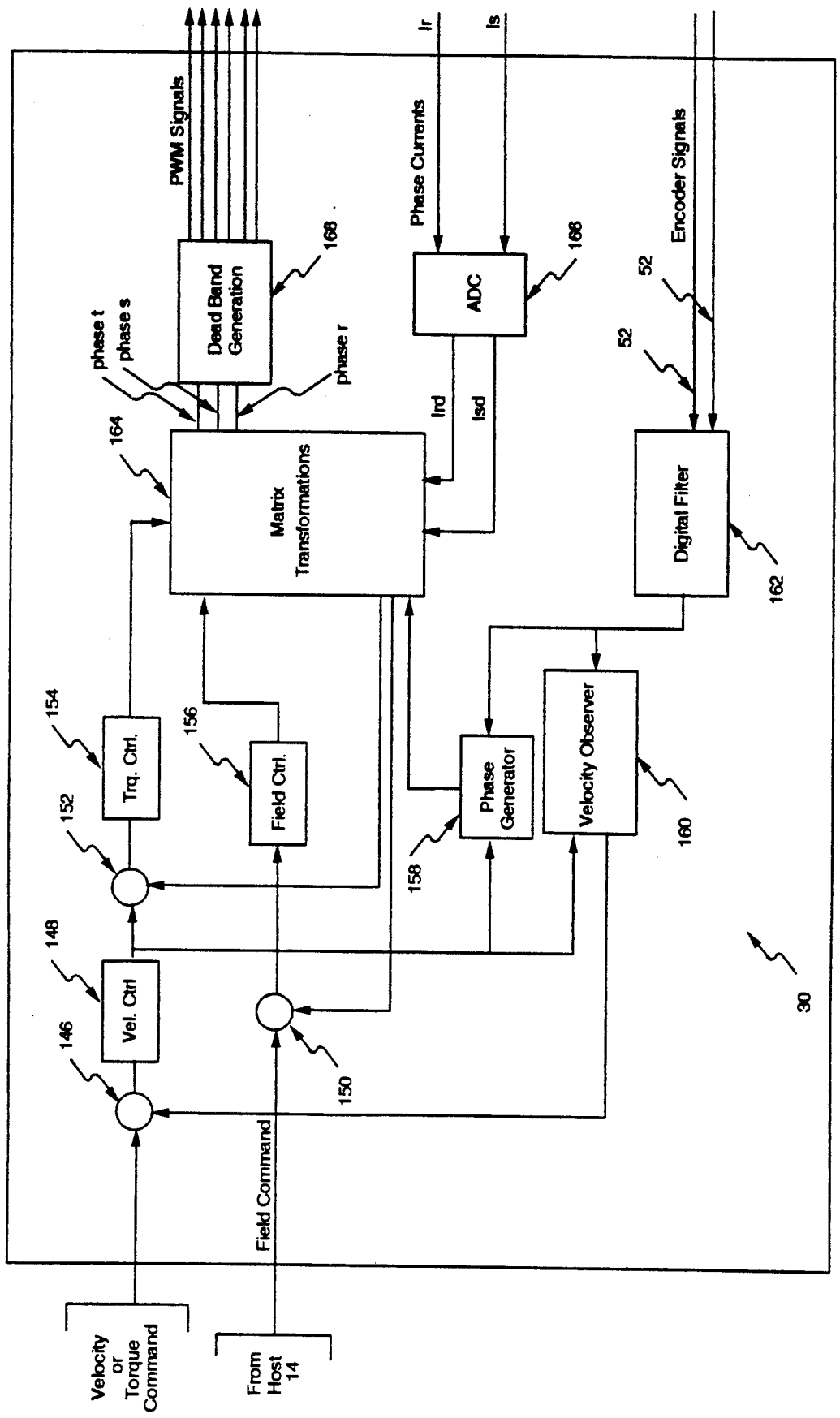
FIG. 5 is a block diagram of processing functions performed by the motion controller of the present invention.

FIG. 5 is a functional block diagram of the processing performed by power control block 30 of the present invention to produce power control outputs for one axis of motion. Power control block 30 receives as inputs the velocity output signal from motion control block 28, encoder signals from a motor (for example motor 18) and phase currents $I_r$ and $I_s$ from power stage 16. Power control block 30 also receives instructions from host computer 14 to adapt its operation to the demands of the type of motor being used. Host computer 14 places instructions on standard industrial bus 26. These instructions are routed through motion control block 28 of motion controller 12 and placed on digital signal processor bus 32. Power control block 30 receives the instructions from digital signal processor bus 32 and uses them to direct its operation.

For each axis of motion, power control block 30 includes the functional components shown in FIG. 5. These components are summing node 146, velocity control function 148, summing node 150, summing node 152, torque control function 154, field control function 156, phase generator 158, velocity observer 160, digital filter 162, matrix transformation function 164, analog-to-digital converter 166 and dead band generation function 168.

Power control block 30 receives the velocity output signal from digital signal processor bus 32. The velocity output signal is furnished to summing node 146, where it is combined with a velocity feedback signal to produce a velocity error. The velocity error is provided to velocity control function 148 which is a proportional, integral and differential (PID) control function. Velocity control function 148 chooses the appropriate algorithm to use in processing the velocity error signal in response to instructions routed to digital signal processor bus 32 by host computer 14. Velocity control function 148 produces a controlled velocity error signal and furnishes it to summing node 152, to phase generator function 158, and to velocity observer function 160.

Power control block 30 receives encoder signals from motor 18 over line 52. The encoder signals, which are continually updated, represent the relative position of the shaft of motor 18. The encoder signals are passed through digital filter 162 and supplied to phase generator function 158 and velocity observer function 160.

Velocity observer function 160 receives as inputs the controlled velocity error signal and the filtered encoder signal. Velocity observer function 160 processes the continuously received position data represented by the filtered encoder signal and derives from that data the actual velocity of motor shaft 18. Velocity observer function 160 furnishes the velocity feedback signal to summing node 146.

The controlled velocity error is combined at summing node 152, with torque producing current feedback from matrix transformation function 164 to produce a torque error signal. The torque error signal is furnished to torque control function 154, a PID function. Torque control function 154 chooses the appropriate algorithm to use in processing the torque error signal in response to instructions routed to digital signal processor bus 32 by host computer 14. Torque control function 154 produces a controlled torque error signal and furnishes it to matrix transformation function 164.

Power control block 30 receives the field command signal, which is passed from host computer 14 to power control block 30 along digital signal processor bus 32. Host computer 14 selects the appropriate field command signal depending on the motor type being used. The field command signal is furnished to summing node 150, where it is combined with field producing current feedback from matrix transformation block 164 to produce a field error signal. The field error signal is furnished to field control function 156, a PID function. Field control function 156 chooses the appropriate algorithm to use in processing the field error signal in response to instructions routed to digital signal processor bus 32 by host computer 14. Field control function 156 produces a controlled field error signal and furnishes it to matrix transformation function 164.

Phase generator function 160 receives as inputs the filtered encoder signal and the controlled velocity error signal. Phase generator function 160 also receives instructions from host computer 14 via digital signal processor bus 32. The instructions from host computer 14 direct the algorithm performed by phase generator function 160, and cause it to be adapted to the appropriate motor type. Phase generator function 160 computes a phase shift required to adapt the power control signals to the requirements of the motor type indicated by the instruction received from host computer 14. Phase generator function 160 produces a phase shift command and provides it to matrix transformation function 164.

Analog-to-digital converter 166 receives as inputs sensed phase currents $I_r$ and $I_s$ from power stage 16 and converts them into digital current representations $I_{rd}$ and $I_{sd}$. In performing its conversion, analog-to-digital converter 166 responds to instructions received over digital signal processor bus 32 from host computer 14.

Matrix transformation function 164 receives as inputs the phase currents $I_{rd}$ and $I_{sd}$ from analog-to-digital converter 166. Matrix transformation function 164 also receives as inputs the controlled field error signal, the phase generator signal, and the controlled torque error signal. Matrix transformation function 164 produces as outputs power control signals phaser, phases, phaset, the torque producing current feedback signal, and a field producing current feedback signal.

Matrix transformation function 164 processes phase shift, controlled torque error and controlled field error to produce power control signals in a synchronous frame of reference, rather than a stationary frame of reference, so that the power control signals will be able to drive a 3-phase AC motor. Matrix transformation function 164 selects the appropriate algorithm based on instructions received from host computer 14 over digital signal processor bus 32 to produce power control signals phaser, phases and phaset appropriate to the motor type being used.

Dead band generation function 168 receives as inputs power control signals phaser, phases and phaset produced by matrix transformation function 164. For each phase produced, power stage 16 requires that an upper and lower transistor be driven. Dead band generation function 168 produces for each phase the non-overlapping power control signals required by power stage 16. Dead band generation function 168 is directed in its operation by instructions received from host computer 14 over digital signal processor bus 32. Dead band generation function 168 produces PWM signals which are supplied to power stage 16 over bus 34. Processing similar to that depicted in FIG. 5 is also carried out in power block 30 to drive motors 20, 22 and 24.

Figure 6:
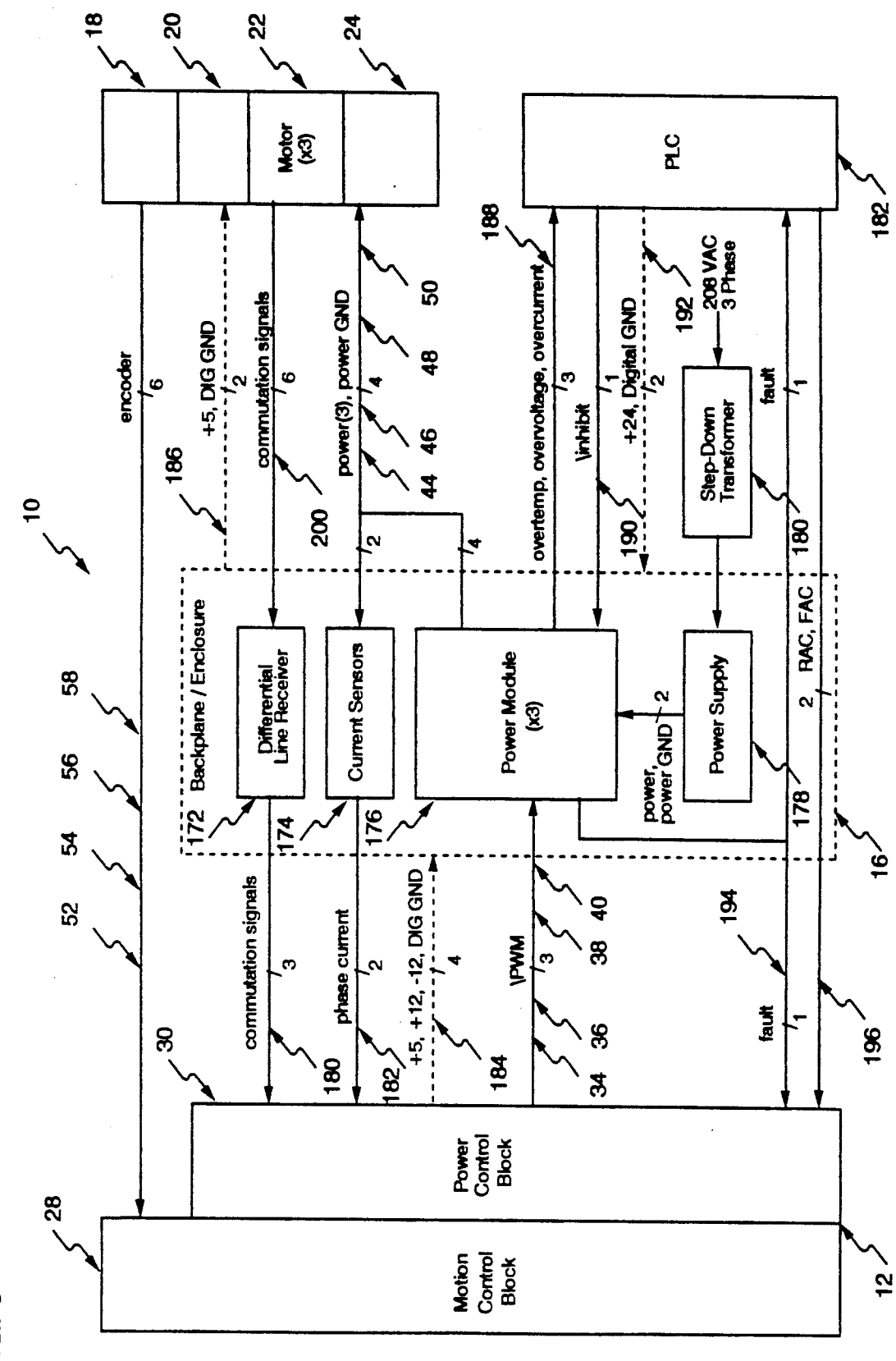
FIG. 6 is a block diagram of a control system using a motion controller of the present invention, showing the connections between the motion controller and the power stage.

FIG. 6 shows a block diagram of motion control system 10 using motion controller 12. FIG. 6 shows the connections between motion controller 12 and power stage 16 and the components that make up power stage 16.

Power stage 16 includes differential line receiver 172, current sensor block 174, power module block 176 and power supply block 178. Power stage 16 communicates with motion controller 12, with motors 18, 20, 22 and 24 and with programmable logic control (PLC) 182. PLC 182 provides user control of power stage 16 independent of motion controller 12. PLC 182 receives overtemperature, overvoltage and overcurrent signals from power stage 16 via bus 188. PLC 182 receives fault information from power stage 16 via line 194. PLC 182 provides an inhibit signal to power stage 16 via line 190. PLC 182 provides +24 V and digital ground signals to power stage 16 via path 192. PLC 182 also provides reverse amplifier clamp and forward amplifier clamp signals to motion controller 12, routing them through power stage 16.

Power stage 16 uses three-phase power which is provided by step-down transformer 180. Step-down transformer 180 receives 208 VAC three-phase power and passes transformed power to power supply 178 of power stage 16 along path 196. Power supply 178 provides power to power module block 176. Power module block 176 receives the PWM signals over buses 34, 36, 38 and 40 from power control block 30 of motion controller 12. Power module block 176 is directed by the PWM signals to provide appropriate driving power to motors 18, 20, 22 and 24. Power module block 176 also furnishes fault information to PLC 182 and power control block 30 of motion controller 12.

Power stage 16 furnishes +5 V and digital ground signals to motors 18, 20, 22 and 24 over bus 186. Power stage 16 receives commutation signals from motors 18, 20, 22 and 24 via path 200 and passes the commutation signals through differential line receiver block 172 to power control block 30 along bus 180. Power stage 16 also receives +5 V, +12 V, −12 V and digital ground signals from motion controller 12 over bus 184. Power stage 16 reads motor current from motors 18, 20, 22 and 24 over line 49 and the other motor leads. This information is supplied to current sensor block 174, which uses it to produce the phase currents. The phase currents are supplied to power control block 30 of motion controller 12 over bus 182.

Motion controller 12 of the present invention can control any of a number of different motor types. The motor type to be controlled can be selected by the operator's command to host computer 14. By using motion controller 12 of the present invention, the operator can upgrade the system to new motor technology simply by changing the commands to host computer 14 without any changes to the rest of the motor control system. The system configures itself for control without any re-wiring or re-design.

Although the present invention has been described with reference to preferred embodiments, workers skilled in the art will recognize that changes may be made in form and detail without departing from the spirit and scope of the invention.

We claim:

1. For use in a motor control system which includes a host system for receiving a control request and passing the control request to a motor controller, a plurality of motors to be controlled based on the control request received by the host system, the motor controller receiving the control request and a motor identification command for the host system, the motor identification command being indicative of a type of motor to be controlled, the motor controller providing a power control signal based on the type of motor to be controlled, the control request, and a control function executed by the motor controller.

2. The motor controller of claim 1 in which the motor controller includes:
   interpolation means for receiving the control request from the host system and for providing an interpolated output signal representative of the control request; and
   variable configuration means, coupled to the interpolation means, for receiving the interpolated output signal, for receiving a motor identification command indicative of a type of motor to be controlled, and for producing the power control signal as a function of the motor identification command and the interpolated output signal.

3. The motor controller of claim 2 and further comprising:
   a power pack for receiving the power control signal and for providing a motor control signal to the motor to be controlled based on the power control signal.

4. The motor controller of claim 3 wherein the control function is implemented as a computer program.

5. The motor controller of claim 3 wherein the means for producing the power control signal includes a digital signal processor.

6. The motor controller of claim 1 wherein the power control signal comprises a pulse width modulated signal.

7. The motor controller of claim 1 wherein the plurality of motors comprise four motors for driving four axes of motion.

8. A motor control system for receiving a control request from a host system and for controlling a plurality of motors based on the control request, the motor control system comprising:

interpolation means for receiving the control request and for providing an interpolated output signal representative of the control request;
   variable configuration means, coupled to the interpolation means, for receiving the interpolated output signal, for receiving a motor identification command indicative of a type of motor to be controlled, and for providing a power control signal based on the type of motor to be controlled, the interpolated output signal and a control function executed by the variable configuration means; and
   a power pack, coupled to the variable configuration means, for receiving the power control signal and for providing a motor control signal to the motor to be controlled based on the power control signal.

9. The motor control system of claim 8 wherein the variable configuration means comprises:
   means for receiving feedback signals indicative of the position of the plurality of motors; and
   means for providing the power control signal based on the feedback signals.

10. The motor control system of claim 8 wherein the host computer provides the motor identification command indicative of the type of motor to be controlled.

11. A motor controller for controlling a plurality of motors based upon position and velocity commands from a host system, the motor controller comprising:
    interpretation and interpolation means for providing interpolated velocity and position commands as a function of the position and velocity commands from the host system;
    position control means for providing torque commands as a function of the position
    position control means for providing torque commands as a function of the position and velocity commands and feedback signals from the motors; and
    motor and drive technology select means for providing power control signals to drive the motors as a function of the torque commands and a motor identification command which indicates a motor type for each of the motors.

* * * * *